US007130542B2

United States Patent
Novak et al.

(10) Patent No.: US 7,130,542 B2
(45) Date of Patent: *Oct. 31, 2006

(54) MODULAR MULTIPLEXING/DEMULTIPLEXING UNITS IN OPTICAL TRANSMISSION SYSTEMS

(75) Inventors: Dalma Novak, Columbia, MD (US); Bo Pedersen, Annapolis, MD (US); Quan-Zhen Wang, New York, NY (US)

(73) Assignee: Corvis Corporation, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/893,048

(22) Filed: Jul. 16, 2004

(65) Prior Publication Data

US 2005/0041974 A1 Feb. 24, 2005

Related U.S. Application Data

(63) Continuation of application No. PCT/US03/01478, filed on Jan. 16, 2003.

(51) Int. Cl.
*H04J 14/02* (2006.01)

(52) U.S. Cl. ............................. 398/79; 398/81; 398/82; 398/84; 398/91; 398/141; 398/147; 398/148; 398/158; 398/159; 398/192; 398/193; 398/202; 398/208; 398/214; 385/24; 385/27; 385/37

(58) Field of Classification Search ................... 398/79, 398/81, 82, 84, 91, 141, 147, 148, 158, 159, 398/192, 193, 202, 208, 214; 385/24, 27, 385/37

See application file for complete search history.

(56) References Cited

U.S. PATENT DOCUMENTS

| 5,557,439 | A | | 9/1996 | Alexander et al. | |
|---|---|---|---|---|---|
| 5,612,807 | A | * | 3/1997 | Ishikawa et al. | 398/81 |
| 6,021,235 | A | | 2/2000 | Yamamoto et al. | |
| 6,091,538 | A | | 7/2000 | Takeda et al. | |
| 6,271,948 | B1 | | 8/2001 | Toyohara | |
| 6,281,997 | B1 | | 8/2001 | Alexander et al. | |
| 6,292,603 | B1 | | 9/2001 | Mizuochi et al. | |
| 6,404,948 | B1 | | 6/2002 | Alexander et al. | |
| 6,445,850 | B1 | | 9/2002 | Zhou et al. | |
| 6,708,002 | B1 | * | 3/2004 | Novak et al. | 398/79 |
| 6,738,181 | B1 | * | 5/2004 | Nakamoto et al. | 359/337 |
| 6,832,048 | B1 | * | 12/2004 | Ishida et al. | 398/87 |
| 6,925,262 | B1 | * | 8/2005 | Ooi et al. | 398/147 |

OTHER PUBLICATIONS

AT&T Technical Journal: A Journal of the AT&T Companies, vol. 74, No. 1, Jan./Feb. 1995, 106 pages.

* cited by examiner

*Primary Examiner*—Hanh Phan

(57) ABSTRACT

An optical transmission system includes a number of corresponding modular multiplexing and demultiplexing units used in transmitting and receiving an optical signal respectively. Additionally, compensation components compensate for optical dispersion experienced by the optical signal. The modular multiplexing and demultiplexing units are assembled in a cascade fashion at the transmit side and the receive side of the optical transmission system, respectively. The dispersion compensation components share dispersion compensation fiber across the cascaded units.

18 Claims, 12 Drawing Sheets

MODULAR MULTIPLEXING/DEMULTIPLEXING UNITS IN OPTICAL TRANSMISSION SYSTEMS

CROSS-REFERENCE TO RELATED APPLICATIONS

This application is a continuation of PCT Patent Application No. PCT/US03/01478, filed Jan. 16, 2003, which claims priority from U.S. patent application Ser. No. 10/046,207, filed Jan. 16, 2002, both of which are incorporated herein by reference.

STATEMENT REGARDING FEDERALLY SPONSORED RESEARCH OR DEVELOPMENT

Not Applicable.

BACKGROUND OF THE INVENTION

Optical systems transmit information as optical signals through optical fiber. When sending optical signals over long distances, a number of optical channels may be simultaneously transmitted over a long length of fiber. Each of the optical channels correspond to a light source of a certain wavelength that is modulated with the data signal of the channel. The channels may be multiplexed together for transmission through the fiber.

FIG. 1 is a diagram illustrating an optical communication system 100. Transmitters 101–102 receive input information channels 120–121. Those skilled in the art will appreciate that many more than two, e.g., several hundred, channels may be used although only two are shown here to simplify the figure. Transmitters 101–102 may be long reach transmitters (LRTRs) that convert the input information channels 120–121 from electrical signals to optical information modulated around preset wavelengths. These optical channels are then combined by wavelength division multiplexer (WDM) 103 into a single WDM signal and transmitted over fiber link 115. Fiber, connection 115 may include a number of optical fibers, each of which carries WDM signals, as well as repeaters 105 that, among other things, amplify the WDM signal.

The receiving side of communication system 100 includes WDM 110 and receivers 111–112. WDM 110 demultiplexes the received WDM signal into the original channels (wavelengths). Receivers 111–112 receive the demultiplexed optical channels and convert them back to electrical signals.

WDM signals traveling through fiber connection 115 experience chromatic dispersion. Dispersion refers to the fact that the different wavelengths in the WDM signal travel at different speeds in fiber connection 115. These different speeds cause the waveforms to become distorted as they travel through the fiber connection 115. In part, this dispersion can be managed by inserting fiber segments having appropriate dispersion characteristics along the fiber connection 115. While this reduces the average dispersion across the fiber connection 115, there remains some residual, wavelength dependent dispersion to be compensated.

One technique for compensating for this residual dispersion involves inserting a length of dispersion compensating optical fiber into the path of each optical signal. WDM 103 and/or WDM 110, for example, may include such a length of optical fiber for each of its input optical channels. An example of this technique can be illustrated by the situation in which each of a plurality of optical transmitters are connected to an array waveguide (AWG) through differing lengths of dispersion compensating fiber. Both the length and the type (i.e., positive or negative dispersion compensation) are selected based upon the expected residual dispersion associated with the wavelength (channel) at which each transmitter is operating. The required length of the dispersion compensating fiber can be relatively large (e.g., 80 km) for channels that require significant residual compensation. As more channels are added to the system, the amount of dispersion compensating fiber used in the WDM 103 and/or 110 quickly becomes a significant expense as well as increasing the size of the unit which causes it to use up valuable floor space in, e.g., a cable landing station. Moreover, the lossy nature of such parallel dispersion compensation schemes may require a large number of amplifiers.

Thus, there is a need in the art to be able to more efficiently multiplex and demultiplex optical channels in optical transmission systems.

SUMMARY OF THE INVENTION

Systems and methods consistent with the principles of the invention, among other things, provide for improved optical transmission/reception techniques.

One aspect consistent with the invention is directed to an optical transmission system for transmitting optical channels. The optical transmission system includes a first group of multiplexing units arranged in cascade with one another. The multiplexing units are configured to receive a predetermined number of the optical channels and output a WDM signal based on the predetermined number of received channels and based on a WDM signal from a previous one of the first group of multiplexing units in the cascade of multiplexing units. Further, the optical transmission system includes dispersion compensation fibers each associated with one of the multiplexing units. The dispersion compensation fibers receive the WDM signals output from the associated multiplexing units. The dispersion compensation fibers have a length based on a length of fiber required to compensate for dispersion expected to be experienced by the input optical channels of the associated multiplexing unit and based on a length of fiber implemented in succeeding dispersion compensation fibers associated with the cascaded multiplexing units.

A second aspect consistent with the present invention is a method of transmitting optical channels through an optical fiber. The method includes combining the optical channels into a WDM signal via a group of multiplexing units implemented in cascade with one another. Additionally, the method includes compensating WDM signals output from each of the multiplexing units for optical dispersion. This compensation is performed by transmitting the optical channel output from a particular one of the multiplexing units through a predetermined length of dispersion compensating optical fiber, the predetermined length being set based on the length of optical fiber required to compensate for dispersion expected to be experienced by the WDM signal and based on a length of compensation fiber implemented in succeeding multiplexing units of the cascade of multiplexing units.

A third aspect consistent with the invention is directed to a system for receiving optical channels. The system includes demultiplexing units arranged in cascade with one another. Each of the demultiplexing units includes an input line configured to receive a first WDM signal that contains a number of optical channels, a number of output lines each configured to output a single optical channel, and a composite output line configured to output a second WDM signal. Further, the system includes dispersion compensation fibers associated with the demultiplexing units, each of the dispersion compensation fibers having a length based on a length of fiber required to compensate for dispersion experienced by the first WDM signal and based on a length of compensation fiber implemented in preceding dispersion compensation fibers associated with the cascaded demultiplexing units.

A fourth aspect consistent with the invention is directed to a system that includes modular multiplexing units, an underwater optical network, and modular demultiplexing units. The modular multiplexing units each include a first input line configured to receive a WDM signal, second input lines each configured to receive a single optical channel, and a composite output line configured to output a WDM signal containing information received at the first input line and the second input lines. The modular demultiplexing units include a third input line configured to receive a WDM signal, output lines each configured to output a single optical channel, and a second composite output line configured to output a WDM signal containing information relating to a group of optical channels.

A fifth aspect of the present invention is directed to a method for upgrading an optical communication system. A first set of WDM channels having a first average dispersion value associated therewith is initially provided to the optical communication system. Then, the optical communication system is upgraded by adding a second set of WDM channels having a second average dispersion value associated therewith. The first average dispersion value is less than said second average dispersion value.

BRIEF DESCRIPTION OF THE DRAWINGS

The accompanying drawings, which are incorporated in and constitute a part of this specification, illustrate embodiments of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Implementations consistent with the present invention provide for a cost effective and modular approach to multiplexing and demultiplexing optical channels. More particularly, in one system, a number of modular multiplexing units can be assembled in a cascade fashion to form a larger multiplexing unit. The modular multiplexing units share dispersion compensation fiber across multiple ones of the modular multiplexing units. A corresponding demultiplexing unit is also constructed of modular units and may similarly share dispersion compensation fiber.

Figure 1:
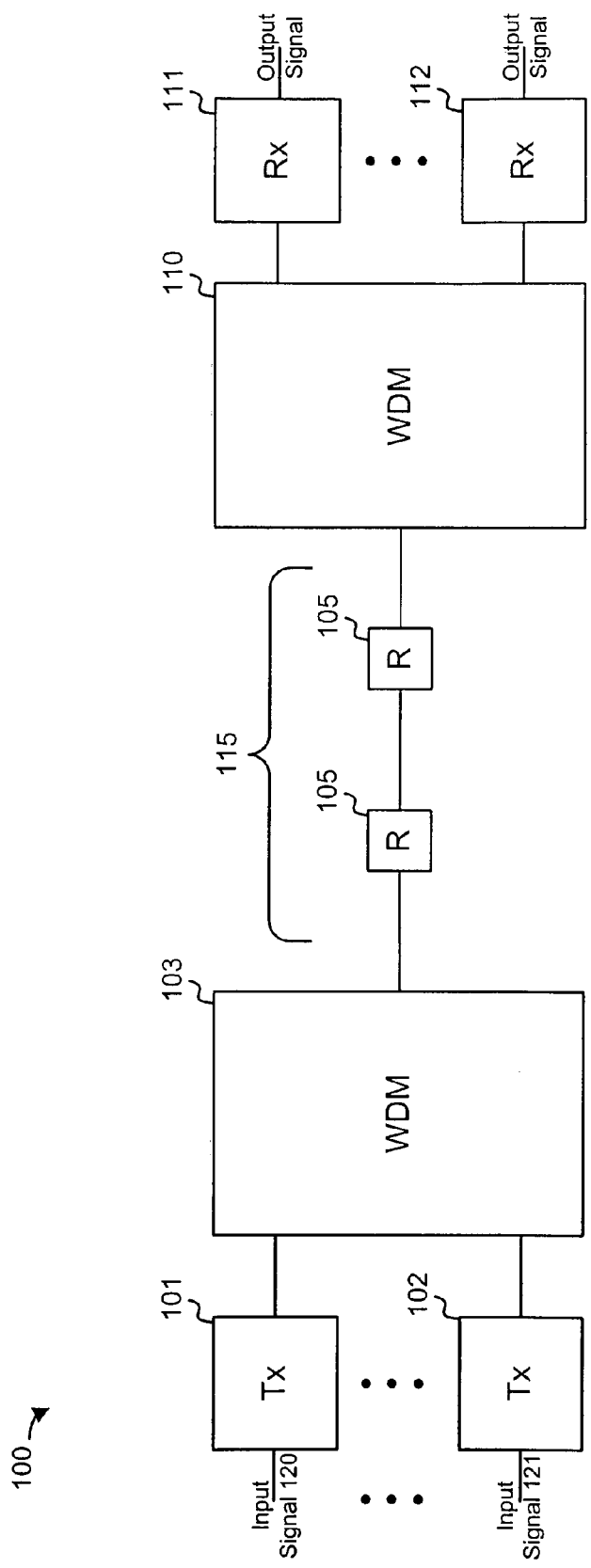
FIG. 1 is a diagram illustrating a conventional optical communication system.
Figure 2:
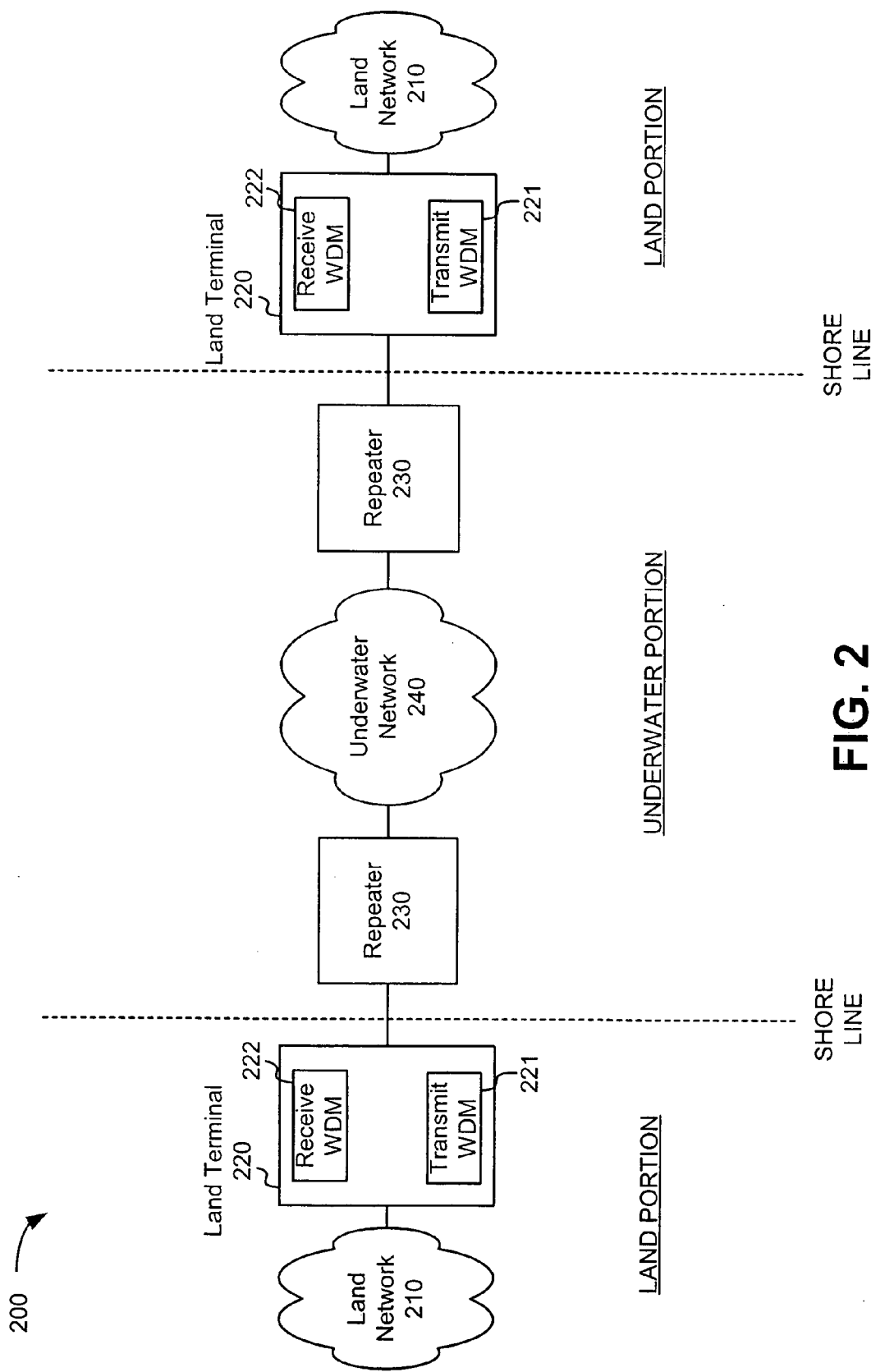
FIG. 2 illustrates an exemplary system in which systems and methods consistent with the present invention may be implemented.

FIG. 2 illustrates an exemplary system 200 in which systems and methods consistent with the present invention may be implemented. As illustrated, system 200 includes two land communication portions that are interconnected via an underwater communication portion. The land portions may include land networks 210 and land terminals 220. Land terminals 220 may include corresponding transmit and receive side WDMs 221 and 222, respectively. The underwater portion may include repeaters 230 and an underwater network 240. Two land networks 210, land terminals 220, and repeaters 230 are illustrated for simplicity. It will be appreciated that a typical system may include more or fewer devices and networks than are illustrated in FIG. 2. Those skilled in the art will appreciate that the present invention is equally applicable to optical communication systems or units that are used in purely terrestrial applications, i.e., those applications which have no underwater portion.

The land network 210 may include one or more networks, such as the Internet, an intranet, a wide area network (WAN), a local area network (LAN), or another type of network. Land terminals 220 convert signals received from the land network 210 into optical signals for transmission to the repeater 230, and vice versa. The land terminals 220 may connect to the land network 210 via wired, wireless, or optical connections. In an implementation consistent with the present invention, the land terminals 220 connect to the repeaters 230 via an optical connection.

The land terminals 220 may include, for example, in addition to WDMs 221 and 222, long reach transmitters/receivers that convert signals into an optical format for long haul transmission and convert underwater optical signals back into a format for transmission to the land network 210. The land terminals 220 may also include optical conditioning units that amplify optical signals prior to transmitting these signals to repeaters 230, and line current equipment that provides power to the repeaters 230 and underwater network 240.

The underwater network 240 may include groups of repeaters and/or other devices capable of routing optical signals in an underwater environment. The repeaters 230 include devices capable of receiving optical signals and transmitting these signals to other repeaters 230 via the underwater network 240 or to land terminals 220.

As mentioned, land terminals 220 include transmit and receive side WDMs 221 and 222. WDMs 221 and 222, in addition to multiplexing or demultiplexing optical signals, may compensate for dispersion experienced by the optical signals as they are transmitted through the optical fiber that connects the land terminals 220. In one aspect consistent with the principles of the invention, WDMs 221 and 222 are implemented as an arrangement that includes modular multiplexing and demultiplexing units.

Figure 3:
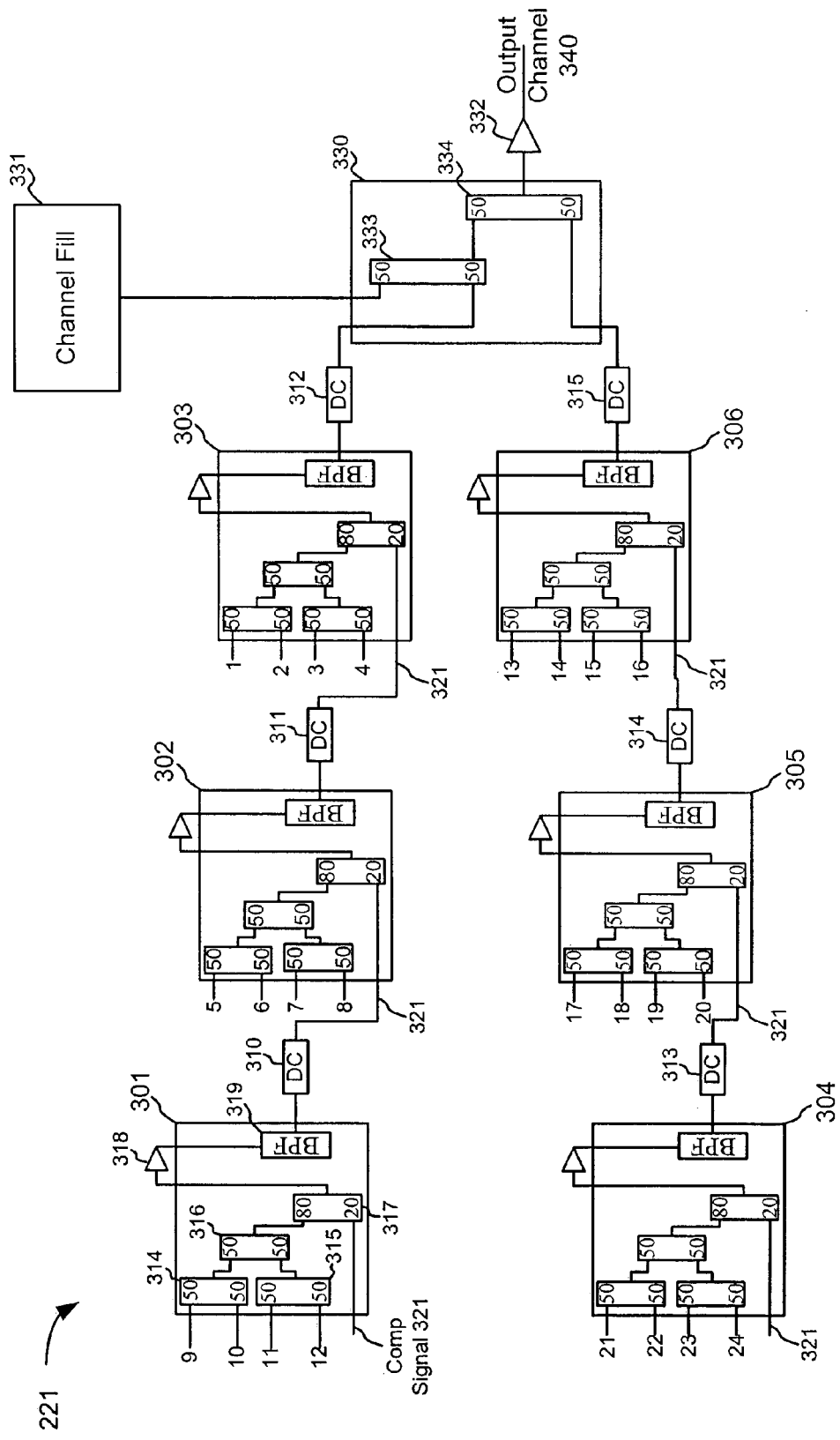
FIG. 3 is a diagram illustrating an implementation of a transmit side wave division multiplexer (WDM) consistent with principles of the invention.

FIG. 3 is a diagram illustrating an implementation of transmit side WDM 221 consistent with the principles of the invention. Transmit WDM 221 includes a number of modular multiplexing units 301–306, which may be connected as a first cascade of modular multiplexing units 301–303 and a second cascade 304–306. Each of multiplexing units 301–306 receives a number of input channels (labeled as channels 1–24), each previously modulated at a specified wavelength, and combines these channels into a WDM signal which includes the information from all of input channels 1–24.

Modular multiplexing units 301–306 may each receive four optical input channels. Modular multiplexing unit 301, for example, receives input channels 9–12. Optical couplers 314–316, of modular modulation unit 301, combine input channels 9–12 into a single optical signal. These four combined input channels 9–12 may additionally be combined with an input WDM signal 321 via coupler 317. In this example, since modular multiplexing unit 301 is the first multiplexing unit in the series of multiplexing units 301–303, the input composite line 321 of multiplexing unit 301 does not currently provide any input to coupler 317. The composite signal line 321 into the succeeding multiplexing units 302 and 303, however, carries the combined channel information of the input channels 9–12. The WDM signal from optical coupler 317 may be further passed through amplifier 318 and bandpass filter (BPF) 319 before leaving modular multiplexing unit 301.

Dispersion compensation (DC) components 310–315 are located at the composite signal input 321 of modular multiplexing units 301, 302, 303, 304, 305, and 306. In one implementation, dispersion compensation components 310–315 are each predetermined lengths of optical fiber designed to offset optical dispersion of the signal as it travels between the land terminal components 220. The DC components are described in more detail below.

Optical couplers 314–316 may be "50/50" optical couplers, meaning that the power in the output signal of the coupler includes a 50% contributions from each of its two input signals. Optical coupler 317 may be an "80/20" optical coupler, in which 80% of the output power signal is passed from the input corresponding to the newly combined input channels and 20% of the power is passed from the input corresponding to the WDM signal 321. The selection of the 80/20 ratio for optical coupler 317 is based on a tradeoff between loss leading into the coupler 317 and gain in amplifier 318. One skilled in the art will recognize that other ratios instead of 80/20 for optical coupler 317 or 50/50 for optical coupler 316 could be used.

Amplifier 318, in one implementation, may be an erbium doped fiber amplifier (EDFA) that has a large dynamic range. Amplifier 318 compensates for loss experienced by the optical signals as they travel through the modular multiplexing unit 301. Although amplifier 318 is shown external to modular multiplexing units 301, in other implementations, the amplifier 318 may be implemented internally to multiplexing units 301–306.

BPF 319 performs a bandpass filtering function. In general, amplifier 318 generates noise in the amplified version of its signal across the whole band. The useful signal information, however, may be confined to a narrow band. BPF 319 suppresses noise in the non-signal portion of the band. Details of the construction of BPFs are well known in the art and will not, therefore, be described further herein.

Although optical couplers 314–317, amplifier 318, and BPF 319 were described in the context of modular multiplexing unit 301, these elements may be identically implemented in modular multiplexing units 302–306. In general, because multiplexing units 301–306 are designed as modular units, they can be exchanged or substituted for one another at will.

The WDM signal 321 from the upper modular multiplexing units 301–303 and the lower modular multiplexing units 304–306 are combined in final multiplexing unit 330. Final multiplexing unit 330 includes two 50/50 optical couplers 333 and 334. Optical coupler 333 receives the composite signal from modular multiplexing unit 303 as one input and the output of channel fill component 331 as the other input. Optical coupler 334 receives the composite signal from modular multiplexing unit 306 (via DC unit 315) as one input and the output of optical coupler 333 as the other input.

Channel fill component 331 provides an output signal to optical coupler 333 that is used to fill out the spectrum of WDM signal 340. More particularly, it is desirable to provide a predetermined amount of optical power throughout the entire signal band during operation, even when some channels are not being used. To this end, channel fill component 331 adds a "dummy" signal to portions of the signal band not used by any of the input channels. Thus, for example, if the number of input channels is increased, channel fill component 331 can be adjusted to remove one or more dummy signals (or reduce the optical power of one or more dummy signals) in the portion of the signal band where new input channels are going into service. An exemplary implementation of channel fill component 331 is described in more detail in copending, commonly assigned U.S. patent application Ser. No. 09/939,783, entitled "Methods of Signal Substitution for Maintenance of Amplifier Saturation", filed on Aug. 28, 2001, the contents of which are hereby incorporated by reference.

Amplifier 332 amplifies the signal from final multiplexing unit 330. Amplifier 332 may be, for example, an EDFA or Raman amplifier. In an alternate implementation, final multiplexer unit 330 may be a modular multiplexing unit such as multiplexing units 301–306.

As previously mentioned, dispersion compensation components 310–315 may each include a predetermined length of dispersion compensating optical fiber designed to offset optical dispersion that will be introduced into the WDM signal as it travels through fiber connection 115. In one aspect of the invention, dispersion compensation components 310–312 and 313–315 are arranged in a cascade fashion such that input signals requiring more dispersion compensation are passed through more dispersion compensation components before becoming part of output channel 340. As shown in FIG. 3, for example, input channel number 9 passes through three dispersion compensation components (310, 311, and 312) while input channel number 5 only passes through two dispersion compensation components (311 and 312). Additionally, those channels requiring positive dispersion compensation are handled in one branch (e.g., modular multiplexing units 301–303), while those channels requiring negative dispersion compensation are handled in another branch (e.g., modular multiplexing units 304–306).

The operation of dispersion compensation components 310–315 will be further described with reference to FIG. 4.

Figure 4:
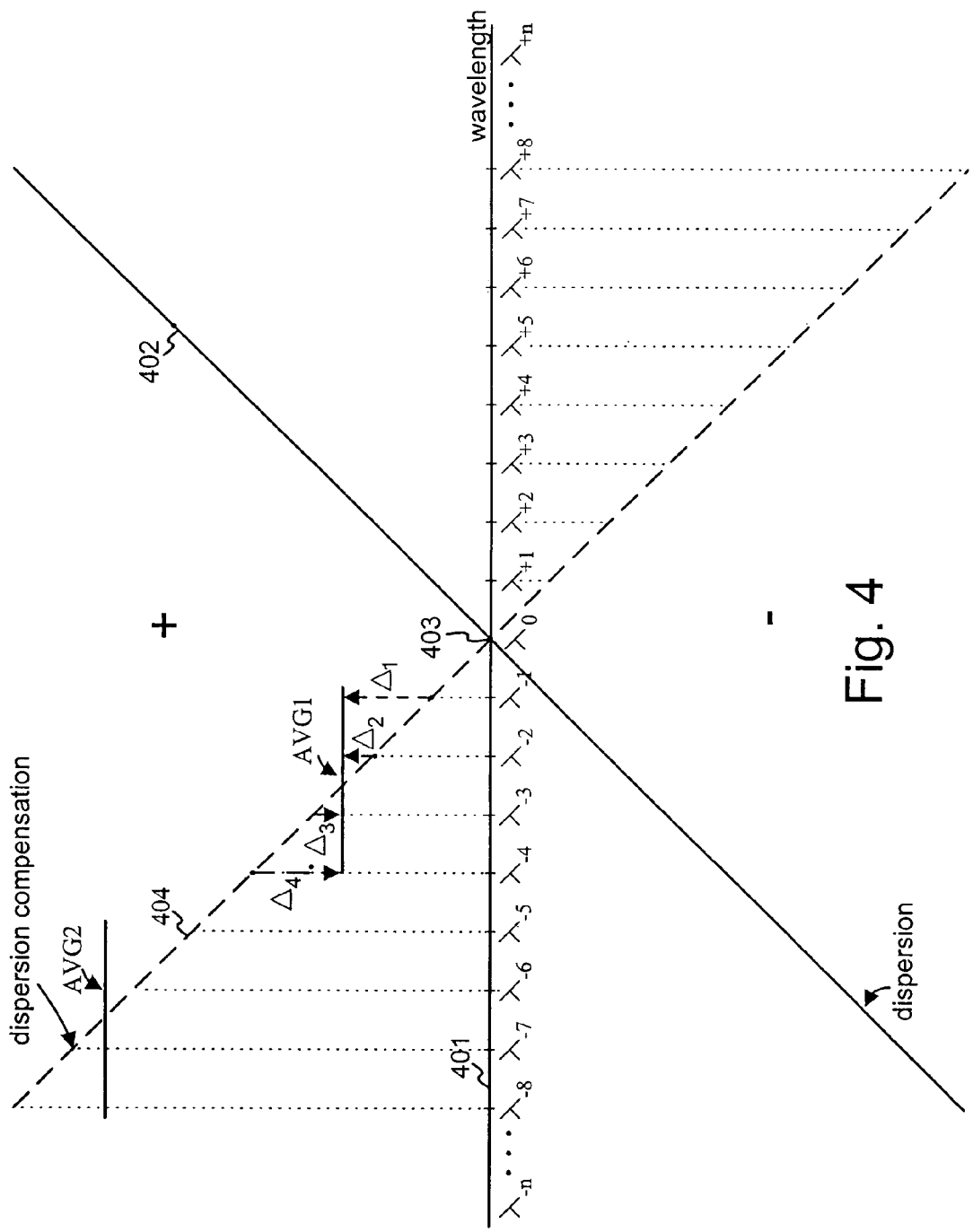
FIG. 4 is a diagram that conceptually illustrates dispersion experienced by optical signals.

FIG. 4 is a graph illustrating the effect of residual dispersion as a function of carrier wavelength in an optical fiber. Horizontal axis 401 represents the wavelength of the carrier light wave and line 402 illustrates dispersion introduced by the fiber. As shown, at center wavelength 403 ($\lambda_0$), the dispersion is essentially zero. To the right of wavelength 403 (lambda $\lambda_{+1}, \lambda_{+2}, \ldots, \lambda_{+n}$) the fiber introduces positive dispersion to the signals. To the left of wavelength 403 (lambda $\lambda_{-1}, \lambda_{-2}, \ldots, \lambda_{-n}$) the fiber introduces negative dispersion to the signals. Dispersion correction curve 404 represents the amount of dispersion correction required to compensate for the dispersion introduced according to dispersion curve 402. As shown, to the left of wavelength 403, negative dispersion introduced by fiber connection 115 requires a compensation fiber with a positive dispersion factor to offset the introduced negative dispersion. Similarly, to the right of wavelength 403, positive dispersion introduced by fiber connection 115 requires a compensation fiber with a negative dispersion factor.

Consistent with the principles of the invention, instead of using a separate compensation fiber for each wavelength, the signals from multiple wavelengths, such as $\lambda_{-1}, \lambda_{-2}, \lambda_{-3}$, and $\lambda_{-4}$, may be passed through a single compensation component (e.g., compensation component 312) that is based on the average length required by the multiple wavelengths. For example, as shown in FIG. 4, wavelengths $\lambda_{-1}$–$\lambda_{-4}$ may be initially passed through a single compensation fiber having a length corresponding to "AVG1." In this situation, the four resultant signals would each contain a measure of residual dispersion error, shown as $\Delta_1$–$\Delta_4$ in FIG. 4. This residual dispersion error may be corrected on a per-channel basis. In general, the length of compensation fiber required to correct the per-channel residual dispersion error is significantly less than the fiber used in dispersion compensation components 310–315.

Modular multiplexing units 301–306 implement compensation fiber averaging as described in the previous paragraph. The four input channels 1–4 for modular multiplexing unit 303, for example, are combined in modular multiplexing unit 301 and then passed through a single compensation component 312. The length of the compensation fiber in compensation component 312 is set to the average compensation length required by input channels 1–4.

In addition to using a single compensation component across multiple (e.g., four) input channels, the serial arrangement of modular multiplexing units 301–303 and 304–306 allow the various lengths of compensation fibers to be set based on a sum of the lengths of the compensation components. Assume that input channels 1–4 have carrier wavelengths $\lambda_{-1}$–$\lambda_{-4}$ (FIG. 4), respectively, while input channels 5–8 have carrier wavelengths $\lambda_{-5}$–$\lambda_{-8}$. AVG2 is greater than AVG1, and thus requires a greater length of positive dispersion compensation fiber than the wavelengths of AVG1. The length of the compensation fiber in compensation component 312 may be set to a length corresponding to AVG1. The length of the compensation fiber in compensation component 311, however, may be set to a length corresponding to the difference in lengths between the compensation fibers required for AVG1 and AVG2. Similarly, the length of the compensation fiber in compensation component 310 is set to a length corresponding to the difference between the average compensation length required for input channels 9–12 and the sum of the compensation fiber lengths in compensation components 311 and 312.

Additional modular multiplexing units may be added to the chain of modular multiplexing units 301–303 by adding the additional units to the left (in FIG. 3) of modular multiplexing unit 301. The carrier wavelengths for the four input channels to the additional modular multiplexing unit may be the next four available wavelengths (i.e., wavelengths $\lambda_{-13}$–$\lambda_{-16}$). The additional modular multiplexing unit would include a corresponding additional dispersion compensation component having a length of compensation fiber set to the incremental increase in the average corresponding to $\lambda_{-13}$–$\lambda_{-16}$ over the total length seen by dispersion compensation component 310.

Modular multiplexing units 304–306 are implemented similarly to modular multiplexing units 301–303, except that the carrier wavelengths for input optical channels 13–24 are to the right of center wavelength 403. Accordingly, these input channels require compensation components 313–315 that introduce negative dispersion into the input channels. Thus, in these compensation components, fiber is used that is designed to introduce negative dispersion to the signal.

Figure 5:
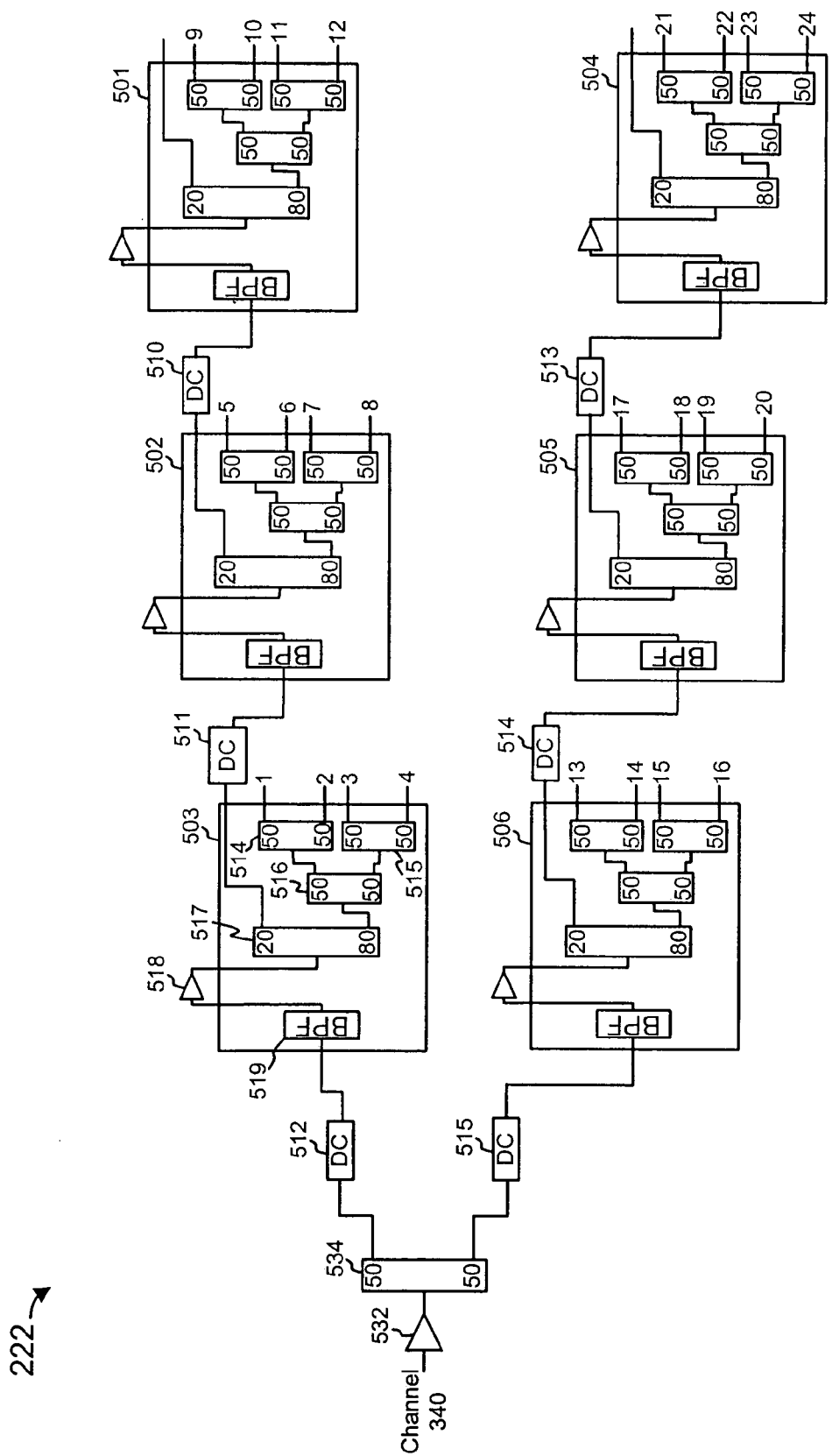
FIG. 5 is a diagram illustrating an implementation of a receive side WDM consistent with principles of the invention.

FIG. 5 is a diagram illustrating an exemplary implementation of a receive side WDM 222. Receive side WDM 222 demultiplexes the optical channels that were combined by transmit side WDM 221. As with transmit side WDM 221, receive side WDM includes modular units which may be connected in a cascade arrangement and uses shared dispersion compensation components.

As shown in FIG. 5, the received WDM signal 340 is initially passed through amplifier 532 and 50/50 optical coupler 534. Optical coupler 534 generates the two WDM signals corresponding to the channels from modular multiplexing units 301–303 and 304–306. Each of the two WDM signals may then pass through the series of demultiplexing modular units 501–503 or 504–506 and the corresponding dispersion compensation components 510–512 or 513–515.

Modular demultiplexing units 501–506 will now be described in more detail with particular reference to modular demultiplexing unit 503. Modular demultiplexing unit 503 includes a BPF 519, an amplifier 518, an 80/20 optical coupler 517, and three 50/50 optical couplers 514–516. BPF 519 and amplifier 518 are similar to BPF 319 and amplifier 318 in the transmit side WDM 221. Specifically, BPF 519 narrows the spectrum to filter out channels that are not being processed by the branch or unit of interest and to avoid saturating the amplifier 518, which is a wide-band amplifier that enhances the signal output from BPF 519. The signal output from amplifier 518 is passed through 80/20 optical coupler 517. The 50/50 optical couplers 514–516 receive one output of the 80/20 optical coupler 517 and operate to produce the original four input channels 1–4. The second output from the 80/20 optical coupler 517 is transmitted from modular demultiplexing unit 513 for further processing by modular demultiplexing unit 502.

Dispersion compensation components 510–515 operate similarly to dispersion compensation components 310–315. In one implementation consistent with the concepts of the invention, half of the total residual dispersion compensation required for any set of input channels is performed at the transmit side WDM 221 and the other half of the required dispersion compensation is performed at the receive side WDM 222. In this implementation, dispersion compensation component 312, for example, would contain half the required length of compensation fiber for channels 1–4 and dispersion compensation component 512 would contain the other half of the required compensation fiber. In other implementations, dispersion compensation may be split between transmit and receive with ratios other than 50/50 and may even be implemented so that all of the dispersion compensation is performed at one of the transmit or receive side WDMs.

As described, transmit and receive side WDMs 221 and 222 function to effectively transmit and receive optical signals over an optical connection. The transmit and receive side WDMs are constructed from a number of modular units in which additional modular units can be added as needed when upgrading existing systems. Further, the modular units effectively share dispersion compensation fiber and require fewer amplifiers, thus decreasing overall system cost.

Figure 6B:
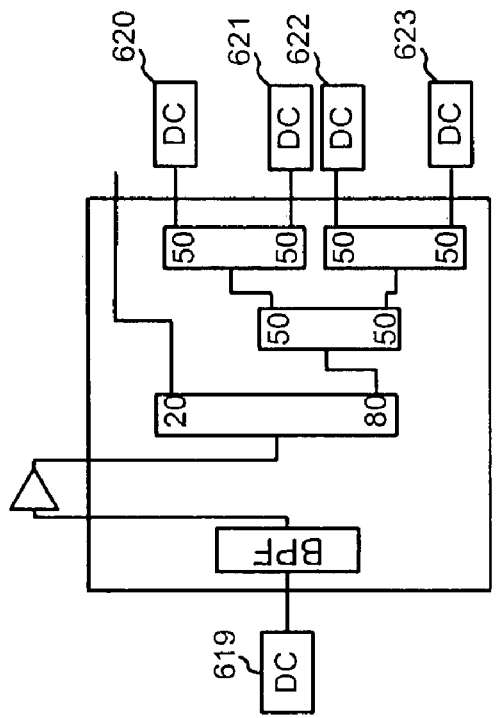
FIGS. 6A and 6B are diagrams illustrating alternate implementations of the modular multiplexing units shown in FIGS. 3 and 5.
Figure 6A:
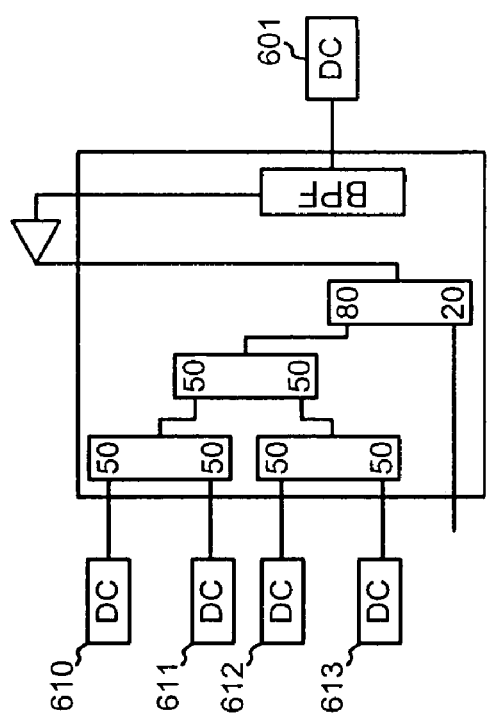

FIG. 6A is a diagram illustrating an implementation of modular multiplexing units 301–306 that include per-channel dispersion compensation components 610–613 as well as a main dispersion compensation component 601. Main dispersion compensation component 601 could be any of dispersion compensation components 310–315. Per-channel dispersion compensation components 610–613 generally require much less fiber and may be used to "fine-tune" the dispersion compensation for any particular channel. Compensation components 610–613 may, for example, be used to eliminate the residual dispersion $\Delta_1$–$\Delta_4$ (FIG. 4). FIG. 6B is a diagram illustrating an implementation of modular demultiplexing units 501–506 that include per-channel dispersion compensation components 620–623 as well as a main dispersion compensation component 619. Dispersion compensation components 620–623 function similarly to components 610–613.

Figure 7:
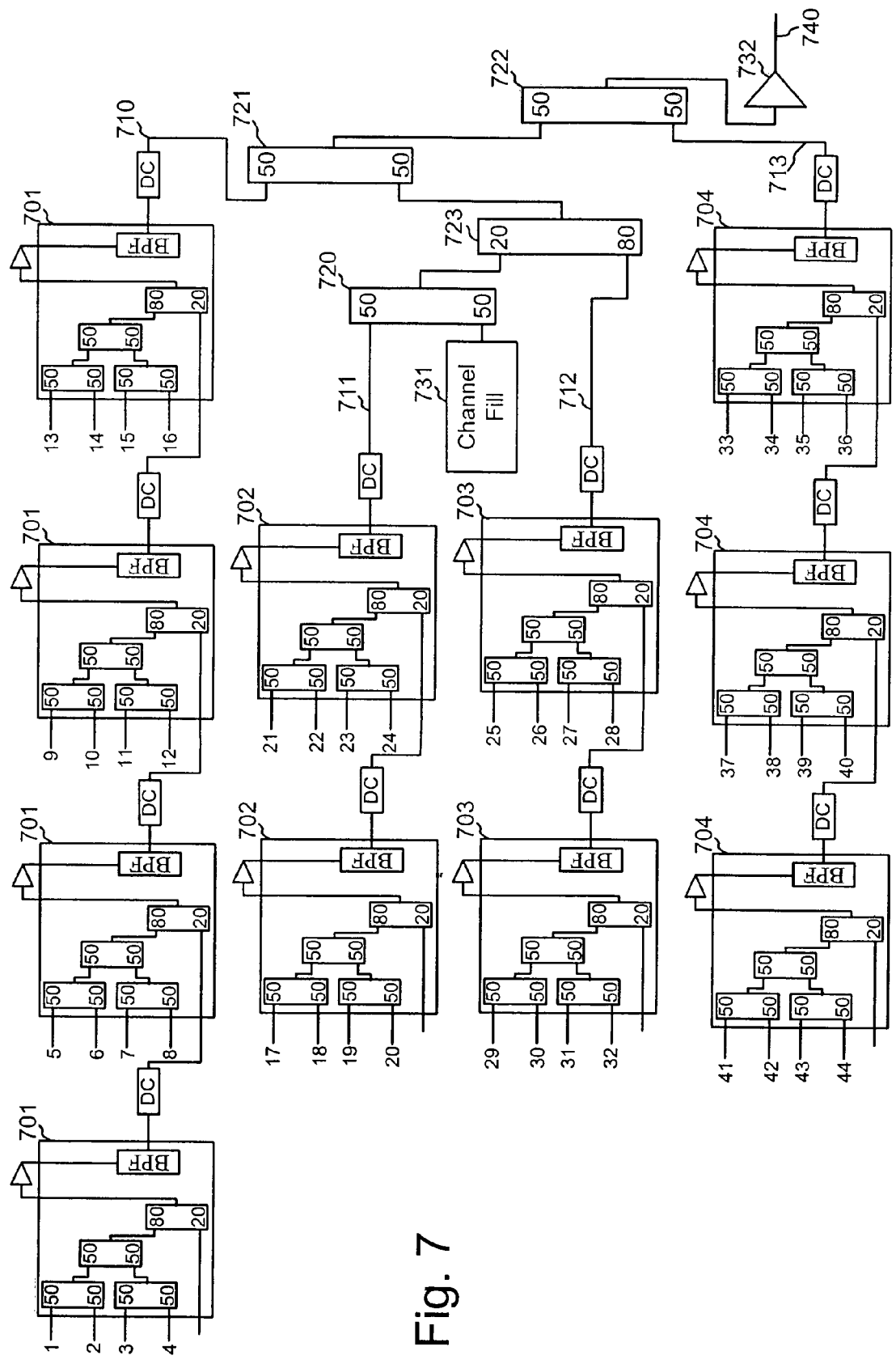
FIG. 7 is a diagram illustrating an alternate implementation of a transmit side WDM consistent with principles of the invention.

FIG. 7 is a diagram illustrating an alternate implementation of the transmit side WDM consistent with principles of the invention. In this implementation, the transmit side WDM includes four cascades of modular multiplexing units. The first cascade includes the four modular multiplexing units 701, the second cascade includes the two modular multiplexing units 702, the third cascade includes the two modular multiplexing units 703, and the last cascade includes the three modular multiplexing units 704. In this manner, the four composite output signals 710–713, encompassing 44 input channels, are produced by the four cascades.

Output channels 710–713 are further combined into a WDM signal 740 through 50/50 optical couplers 720–722 and 80/20 optical coupler 723. Channel fill component 731 functions similarly to channel fill component 331 and provides an output signal that is used to fill out the spectrum of the final output signal 740. More particularly, as shown in FIG. 7, 50/50 coupler 720 receives WDM signal 711 and the output of channel fill component 731. The output of 50/50 coupler 720 is input to 80/20 coupler 723 along with WDM signal 712. The output of 80/20 coupler 723 is then combined with WDM signal 710 by 50/50 coupler 721, the output of which is then combined with WDM signal 713 by 50/50 coupler 722. Amplifier 732 may amplify the final output signal 740 before transmission to the underwater portion of the network. Amplifier 732 may be similar to amplifier 332.

Figure 8:
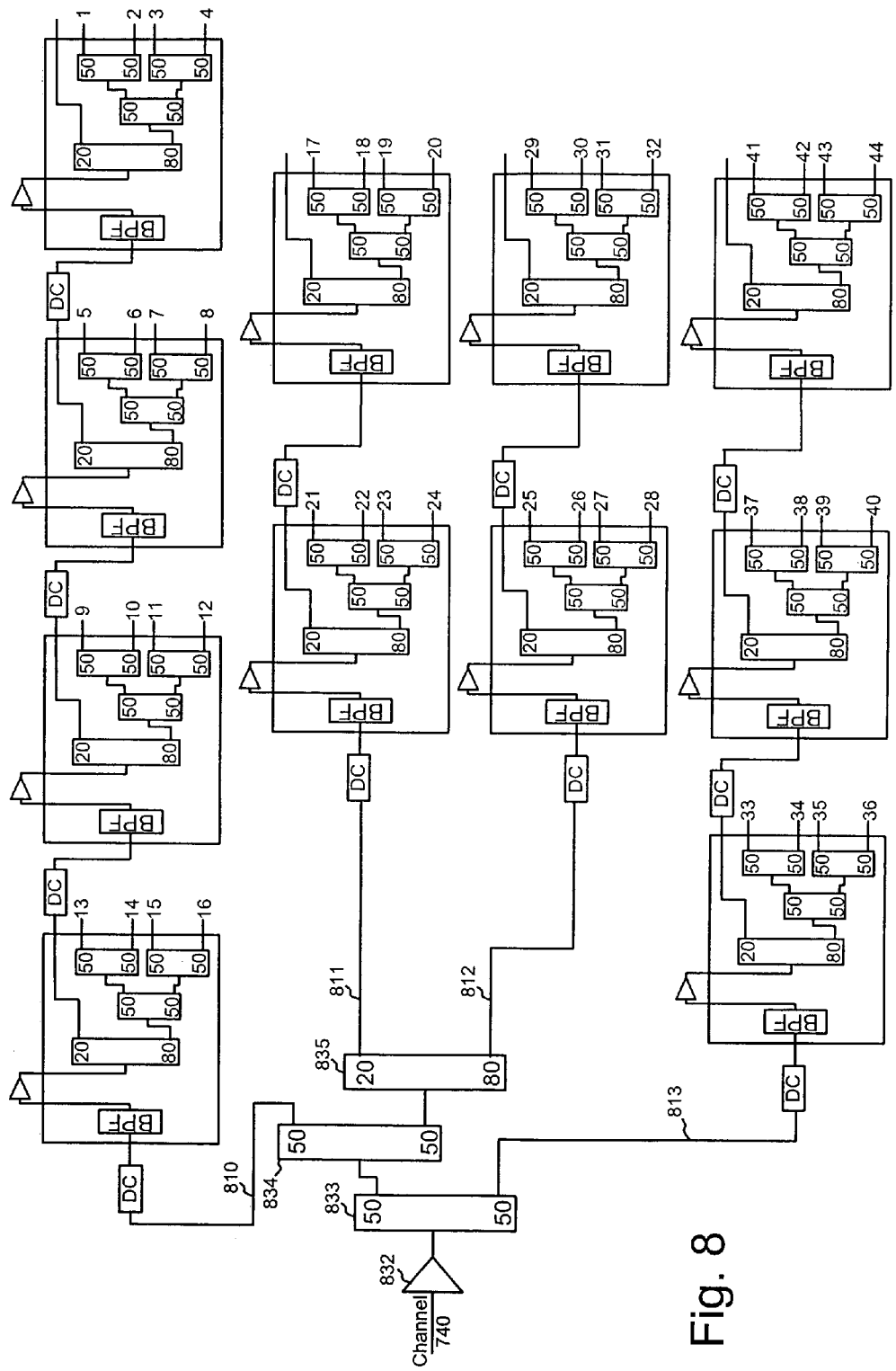
FIG. 8 is a diagram illustrating a receive side WDM corresponding to the transmit side WDM shown in FIG. 7.

FIG. 8 is a diagram illustrating the receive side WDM corresponding to the transmit side WDM illustrated in FIG. 7. As shown, the received channel 740 is initially passed through amplifier 832 and 50/50 optical couplers 833 and 834. One output of 50/50 optical coupler 834 is transmitted to 80/20 optical coupler 835. WDM signals 810–813 are generated by optical couplers 833–835. In a manner similar to the operation of receive side WDM 222, the modular demultiplexing units in the receive side WDM of FIG. 8 recover the original optical channels through a cascade arrangement of the modular demultiplexing units.

Figure 9:
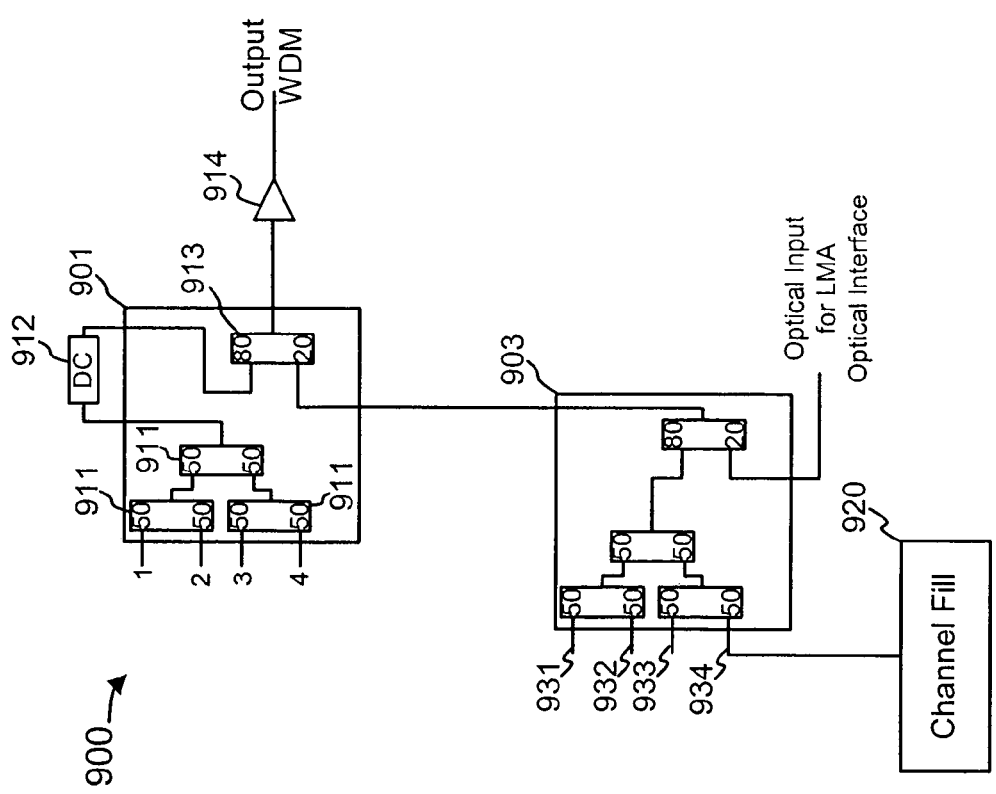
FIG. 9 is diagram illustrating another implementation of a transmit side WDM consistent with principles of the invention.

FIG. 9 is a diagram illustrating another implementation of a transmit side WDM consistent with principles of the invention. Transmit side WDM 900 provides an effective system for upgrading the optical communication channels transmitted through underwater network 240. Transmit side WDM 900 includes multiplexing units 901 and 902. Multiplexing unit 901 may be connected to receive a first group of input channels, shown as four channels, labeled as channels 1–4 in FIG. 9. Channels 1–4 are combined through a series of 50/50 optical couplers 911. The combined channel is then compensated by dispersion compensation component 912 and passed through 80/20 optical coupler 913 to generate the output channel. The output channel is passed through wholeband amplifier 914 before being leaving WDM 900.

Multiplexing unit 903 is implemented similarly to multiplexing unit 901. However, the input channels received my multiplexing unit 903 are different than those of multiplexing unit 901. When only optical channels 1–4 are being transmitted from WDM 900, multiplexing unit 903 receives, at its fourth input channel (labeled as channel 934), a channel fill signal from channel fill component 920.

When a user wishes to upgrade WDM 900 to transmit more channels, the user may add cascades of modular units, such as modular cascades 301–303 and 304–306 to input channels 931 and 932, respectively, of multiplexing unit 903. These modular cascade of multiplexing units are implemented as described with reference to FIG. 3. Input channel 933 of multiplexing unit 903 receives the input from an additional channel fill component when additional channels are added.

Multiplexing units 901 and 903 are cost effective units because they do not require amplifiers 318 and BPFs 319 associated with modular units 301–306. Accordingly, when initially setting up a network, users may begin just with multiplexing units 901 and 903. When the user wishes to add more optical channels, WDM 900 can be upgraded by adding additional modular multiplexing units such as units 301–306.

Figure 10:
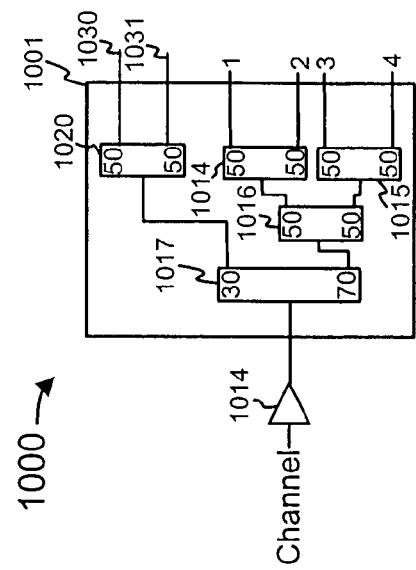
FIG. 10 is a diagram illustrating a received side WDM corresponding to the transmit side WDM shown in FIG. 9.

FIG. 10 is a diagram illustrating an exemplary implementation of a receive side WDM 1000. Receive side WDM 1000 corresponds to transmit side WDM 900. The received composite optical signal is passed through a wholeband amplifier similar to amplifier 914 and then input to modular unit 1001. Modular unit 1001 includes a 70/30 optical coupler 1017. One output of optical coupler 1017 is passed through a 50/50 optical coupler 1020 to generate the two output channels 1030 and 1031, while the other output of optical coupler 1017 is passed through the series of 50/50 optical couplers 1014–1016. Optical couplers 1014–1016 generate the four optical channels corresponding to input channels 1–4 in FIG. 9. Output channels 1030 and 1031 correspond to input channels 931 and 932 in FIG. 9. These two output channels may be further passed through a cascade of modular units similar to modular units 501–506 to generate additional optical output channels.

Figure 11B:
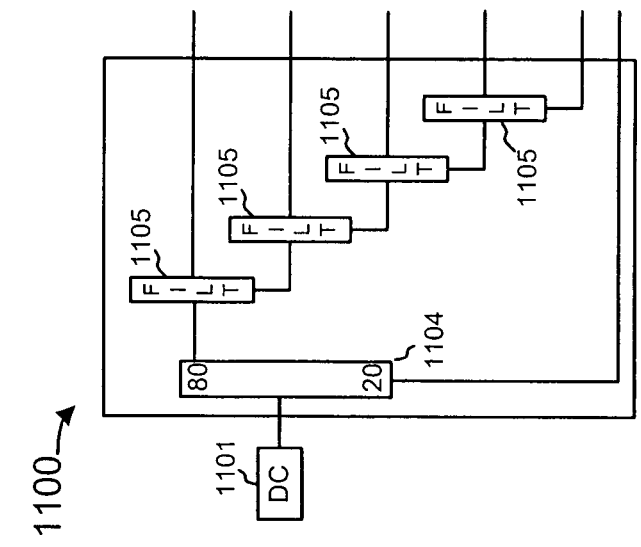
FIGS. 11A–D, 12, and 13 are a diagrams illustrating exemplary implementations of a receive side WDM that are wavelength selective.
Figure 11A:
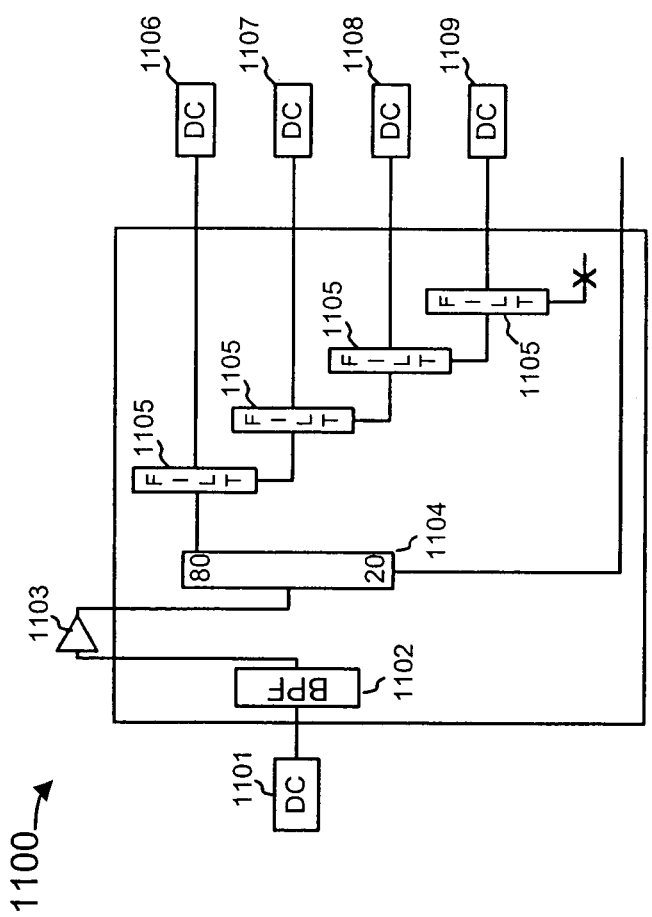

FIG. 11A is a diagram illustrating an exemplary implementation of a receive side WDM 1100 that is wavelength selective in that the outputs of the receive side WDM are limited to a certain desired wavelength or waveband. The receive side WDM 1100 may be used in the various implementations of the present invention as described above. The receive side WDM 1100 includes a BPF 1102, an amplifier 1103, an 80/20 optical coupler 1104, and filters 1105. A coupler with a different coupling ratio may be used as well.

A received WDM signal is initially passed through a dispersion compensation component 1101 to the receive side WDM 1100. The BPF 1102 filters the signal prior to the amplifier 1103 amplifying it. The 80/20 splitter splits the signal to a first output (80%) and a second output (20%). The BPF 1102, amplifier 1103, and 80/20 coupler 1104 are similar to the BPFs, amplifiers, and 80/20 couplers described above. The filters 1105 pass a desired wavelength or waveband and reflect the rest of the WDM signal. The filters 1105 may be thin film filters, fiber Bragg grating filters, or other optical filters that pass a desired wavelength or waveband and reflect the rest. Also, the filter 1105 may reflect the desire wavelength or waveband and pass the rest. The filter 1105 attached to the first output of the 80/20 coupler passes a desired wavelength or waveband out a first output and reflects the rest of the signal to a second output. The second output is connected to a second filter 1105 that passes a different wavelength or waveband and reflects the rest. Four filters 1105 are cascaded to pass out four optical signals with different wavelength/wavebands. Another number of filters may be cascaded as well depending on the desired level of demultiplexing. The reflected output of the last filter 1105 may be terminated in this embodiment and not used. The second output from 80/20 coupler is transmitted from the receive side WDM 1100 for further processing by another receive side WDM 1100. The outputs from the various filters 1105 may be connected to dispersion compensation components 1106, 1107, 1108, and 1109 for further fine tuning of the dispersion compensation.

Figure 11D:
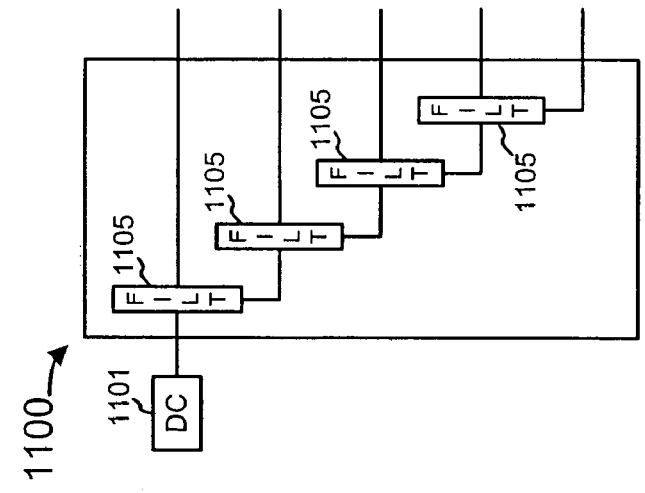
Figure 11C:
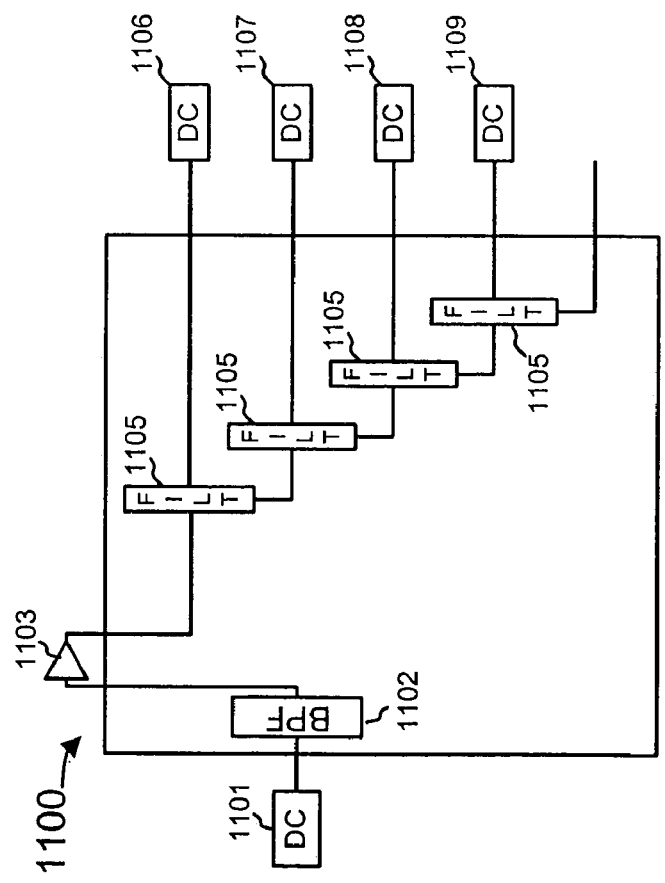

FIGS. 11B, 11C, and 11D are similar to FIG. 11A. FIG. 11B does not have a BPF 1102 and amplifier 1103. This embodiment may be used, for example, when filtering and amplification is not needed. FIG. 11C does not have an 80/20 splitter 1104, so the reflected output from the fourth cascaded filter 1105 may be transmitted from the receive side WDM 1001 for further processing by another receive side WDM 1100. This embodiment may be used, for example, when the dispersion introduced by the filters 1105 is tolerable. FIG. 11D does not have the BFP 1102, amplifier 1103, or the 80/20 splitter 1104.

Figure 12:
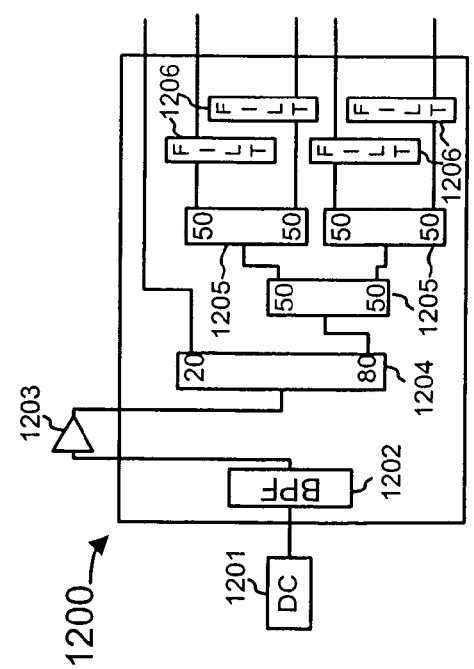

FIG. 12 is a diagram illustrating another exemplary implementation of a wavelength selective receive side WDM 1200. The receive side WDM 1200 has a BPF 1202, an amplifier 1203, and 80/20 splitter 1204, and 50/50 splitters 1205 as described above. Again, the splitters 1205 may have a different coupling ratio. This implementation includes wavelength or waveband selective filters 1206 connected to the output of the cascaded splitters. Each filter passes a different wavelength/waveband resulting in outputs that are wavelength specific. These outputs can be further processed by cascaded receive side WDMs.

Figure 13:
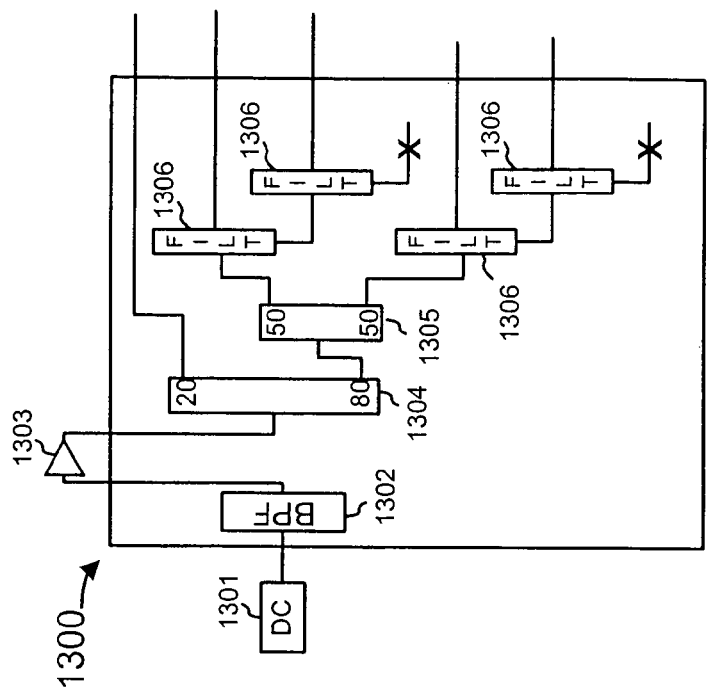

FIG. 13 is a diagram illustrating another exemplary implementation of a wavelength selective receive side WDM 1300. The receive side WDM 1300 has a BPF 1302, an amplifier 1303, and 80/20 splitter 1304, and 50/50 splitter 1305 as described above. Again, the splitters 1304 and 1305 may have a different coupling ratios. This implementation includes two sets of two cascaded wavelength or waveband selective filters 1306 connected to the two output of the 50/50 splitter 1305. Each filter passes a different wavelength or waveband resulting in outputs that are wavelength specific and reflects the rest of the signal as described above. These outputs can be further processed by cascaded receive side WDMs. Again, the reflected output of the last cascaded filter may be terminated or passed on for further processing, in which case the 80/20 splitter 1304 may be removed. In addition, more filters 1306 may be cascaded at each 50/50 splitter 1305 output. In addition, more splitters 1305 may be cascaded or splitters 1305 with more than two outputs may be used as well.

Although the modular multiplexing/demultiplexing units described above are shown based on four optical channels, in other implementations, the modular multiplexing/demultiplexing units may each process more or less than four channels. In addition, while specific numbers of cascade levels are shown, the present invention may employ any number of cascade levels. Also, the total number of channels that can be multiplexed and demultiplexed may vary from the examples shown herein.

Moreover, although the dispersion compensation units in the foregoing examples are implemented using lengths of dispersion compensating fiber, any devices which provide for dispersion compensation can be used, e.g., gratings which are adapted to provide dispersion compensation such as those described in U.S. Pat. No. 6,292,603, the disclosure of which is incorporated here by reference.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A wavelength division multiplexed optical transmission system, comprising:
   a first plurality of series-connect multiplexing units, each configured to receive a plurality of input channels and output a WDM signal based on the plurality of input channels, and wherein at least one of the first plurality of multiplexing units is configured to receive at least one input channel and a WDM signal from another of the first plurality of multiplexing units and is configured to output a WDM signal based on the at least one input channel and the WDM signal from the other of the first plurality of multiplexing units;
   a first plurality of multiplexing dispersion compensation fiber, each connected in series with a corresponding one of the first plurality of multiplexing-units, each of the first plurality of multiplexing dispersion compensation fiber having a length based on dispersion experienced by the input channels received by the corresponding one of the first plurality of multiplexing unit and based on succeeding multiplexing dispersion compensation fibers associated with the first plurality of multiplexing units;
   a second plurality of series-connect multiplexing units, each configured to receive a plurality of input channels and output a WDM signal based on the plurality of input channels, and wherein at least one of the second plurality of multiplexing units is configured to receive at least one input channel and a WDM signal from another of the second plurality of multiplexing units and is configured to output a WDM signal based on the at least one input channel and the WDM signal from the other of the second plurality of multiplexing units;
   a second plurality of multiplexing dispersion compensation fibers, each connected in series with a corresponding one of the second plurality of multiplexing-units, each of the second plurality of multiplexing dispersion compensation fibers having a length based on dispersion experienced by the input channels received by the corresponding one of the second plurality of multiplexing unit and based on succeeding multiplexing dispersion compensation fibers associated with the second plurality of multiplexing units, and wherein dispersion introduced by the second plurality of multiplexing dispersion compensation fibers is opposite in sign to dispersion introduced by the first plurality of multiplexing dispersion compensation fibers;

a final multiplexing unit configured to receive a WDM signal output by the first plurality of multiplexing units, configured to receive a WDM signal output by the second plurality of multiplexing units, and configured to output a WDM signal based on the WDM signal output by the first plurality of multiplexing units and based on the WDM signal output by the second plurality of multiplexing units;

a first plurality of series-connected demultiplexing units each configured to receive a WDM signal and output at least one single optical channel demultiplexed from the received WDM signal, wherein at least one of the first plurality of demultiplexing units is configured to output at least one single optical channel and a WDM signal based on the received WDM signal;

a first plurality of demultiplexing dispersion compensation fibers, each connected in series with a corresponding one of the first plurality of demultiplexing units, each of the first plurality of demultiplexing dispersion compensation fiber having a length based on dispersion experienced by the WDM signal received by the corresponding demultiplexing unit;

a second plurality of series-connected demultiplexing units each configured to receive a WDM signal and output at least one single optical channel demultiplexed from the received WDM signal, wherein at least one of the second plurality of demultiplexing units is configured to output at least one single optical channel and a WDM signal based on the received WDM signal;

a second plurality of demultiplexing dispersion compensation fibers, each connected in series with a corresponding one of the second plurality of demultiplexing units, each of the second plurality of demultiplexing dispersion compensation fiber having a length based on dispersion experienced by the WDM signal received by the corresponding demultiplexing unit, and wherein dispersion introduced by the second plurality of demultiplexing dispersion compensation fibers is opposite in sign to dispersion introduced by the first plurality of demultiplexing dispersion compensation fibers;

an optical coupler configured to receive a WDM signal and output first and second WDM signals, wherein the first and second WDM signals output from the optical coupler are input to the first and second plurality of demultiplexing units, respectively; and a fiber connection between the final multiplexing unit and the optical coupler, whereby a WDM signal output by the final multiplexing unit is received by the optical coupler.

2. The wavelength division multiplexed optical transmission system of claim 1, wherein:

the first plurality of series-connect multiplexing units includes
  a first multiplexing unit configured to receive a plurality of input channels and output a WDM signal based on the plurality of input channels;
  a second multiplexing unit configured to receive at least one input channel and to receive the WDM signal output by the first multiplexing unit, and to output a WDM signal based on the at least one input channel and the WDM signal output by the first multiplexing unit;

the first plurality of multiplexing dispersion compensation fiber includes
  a first dispersion compensation fiber connected in series with the first multiplexing unit, the first dispersion compensation fiber having a length based on a length of fiber required to compensate for dispersion experienced by the input channels of the first multiplexing unit and based on succeeding dispersion compensation fibers associated with the multiplexing units;
  a second dispersion compensation fiber connected in series with the second multiplexing unit, the second dispersion compensation fiber having a length based on a length of fiber required to compensate for dispersion experienced by the input channels of the second multiplexing unit and based on succeeding dispersion compensation fibers associated with the multiplexing units;

the second plurality of series-connect multiplexing units includes
  a third multiplexing unit configured to receive a plurality of input channels and output a WDM signal based on the plurality of input channels;
  a fourth multiplexing unit configured to receive at least one input channel and to receive the WDM signal output by the third multiplexing unit, and to output a WDM signal based on the at least one input channel and the WDM signal output by the third multiplexing unit;

the second plurality of multiplexing dispersion compensation fiber includes
  a third dispersion compensation fiber connected in series with the third multiplexing unit, the third dispersion compensation fiber having a length based on a length of fiber required to compensate for dispersion experienced by the input channels of the third multiplexing unit and based on succeeding dispersion compensation fibers associated with the multiplexing units;
  a fourth dispersion compensation fiber connected in series with the fourth multiplexing unit, the fourth dispersion compensation fiber having a length based on a length of fiber required to compensate for dispersion experienced by the input channels of the fourth multiplexing unit and based on succeeding dispersion compensation fibers associated with the multiplexing units, and wherein dispersion introduced by the third and fourth dispersion compensation fibers is opposite in sign to dispersion introduced by the first and second dispersion compensation fibers.

3. The transmit side wavelength division multiplexer of claim 2, further comprising at least one additional multiplexing unit connected in series with the second multiplexing unit, wherein each of the at least one additional multiplexing unit is configured to receive at least one input channel and to receive a WDM signal output by a preceding multiplexing unit, and wherein each of the at least one additional multiplexing unit is configured to output a WDM signal based on the at least one input channel and the WDM signal output by the preceding multiplexing unit.

4. The transmit side wavelength division multiplexer of claim 2, further comprising:

first and second band pass filters connected in parallel with each other and connected in series with the the final multiplexing unit, wherein the first band pass filter passes a first portion of a WDM signal, wherein the second band pass filter passes a second portion of a WDM signal, and wherein the first portion of the WDM signal and the second portion of the WDM signal are different.

5. The transmit side wavelength division multiplexer of claim 4, wherein the first portion of the WDM signal and the second portion of the WDM signal are mutually exclusive.

6. The transmit side wavelength division multiplexer of claim 2, further comprising:
   a plurality of first band pass filters, wherein each of the plurality of first band pass filters is connected in series with a respective one of the first plurality of multiplexing units, wherein the plurality of first band pass filters passes a plurality of first portions of WDM signals;
   a plurality of second band pass filters, wherein each of the plurality of second band pass filters is connected in series with a respective one of the second plurality of multiplexing units, wherein the plurality of second band pass filters passes a plurality of second portions of WDM signals, and wherein the plurality of first portions of WDM signals and the plurality of second portions of WDM signals are different.

7. The transmit side wavelength division multiplexer of claim 6, wherein the plurality of first portions of WDM signals and the plurality of second portions of WDM signals are mutually exclusive.

8. The wavelength division multiplexed optical transmission system of claim 1, wherein:
   the first plurality of series-connect demultiplexing units includes
      a first demultiplexing unit configured to receive a WDM signal and configured to output a plurality of single optical channels demultiplexed from the WDM signal and configured to output a WDM signal based on the received WDM signal and based on the single optical channels demultiplexed from the WDM signal;
      a second demultiplexing unit configured to receive the WDM signal output from the first demultiplexing unit and configured to output a plurality of single optical channels demultiplexed from the WDM signal received from the first demultiplexing unit;
   the first plurality of demultiplexing dispersion compensation fibers includes
      a first dispersion compensation fiber connected in series with the first demultiplexing unit, the first dispersion compensation fiber having a length based on a length of fiber required to compensate for dispersion experienced by the optical channels output by the first demultiplexing unit and based on preceding dispersion compensation fibers associated with the demultiplexing units;
      a second dispersion compensation fiber connected in series with the second demultiplexing unit, the second dispersion compensation fiber having a length based on a length of fiber required to compensate for dispersion experienced by the optical channels output by the second multiplexing unit and based on preceding dispersion compensation fibers associated with the demultiplexing units;
   the second plurality of series-connect demultiplexing units includes
      a third demultiplexing unit configured to receive a WDM signal and configured to output a plurality of single optical channels demultiplexed from the WDM signal and configured to output a WDM signal based on the received WDM signal and based on the single optical channels demultiplexed from the WDM signal;
      a fourth demultiplexing unit configured to receive the WDM signal output from the third demultiplexing unit and configured to output a plurality of single optical channels demultiplexed from the WDM signal received from the third demultiplexing unit;
   the second plurality of demultiplexing dispersion compensation fibers includes
      a third dispersion compensation fiber connected in series with the third demultiplexing unit, the third dispersion compensation fiber having a length based on a length of fiber required to compensate for dispersion experienced by the optical channels output by the third multiplexing unit and based on preceding dispersion compensation fibers associated with the demultiplexing units;
      a fourth dispersion compensation fiber connected in series with the third demultiplexing unit, the fourth dispersion compensation fiber having a length based on a length of fiber required to compensate for dispersion experienced by the optical channels output by the fourth multiplexing unit and based on preceding dispersion compensation fibers associated with the demultiplexing units, and wherein dispersion introduced by the third and fourth dispersion compensation fibers is opposite in sign to dispersion introduced by the first and second dispersion compensation fibers; and
   the optical coupler is configured to receive a WDM signal and output first and second WDM signals, wherein the first and second WDM signals output from the optical coupler are input to the first and third demultiplexing units, respectively.

9. The receive side wavelength division demultiplexer of claim 8, further comprising at least one additional demultiplexing unit connected in series with the second demultiplexing unit, wherein each of the at least one additional demultiplexing unit is configured to receive a WDM signal output by a preceding demultiplexing unit, and wherein each of the at least one additional demultiplexing unit is configured to output at least one single optical channel demultiplexed from the WDM signal received from the preceding demultiplexing unit.

10. The receive side wavelength division demultiplexer of claim 8, further comprising:
   a first band pass filter connected in series with the first demultiplexing unit, wherein the first band pass filter passes a first portion of the first WDM signal;
   a second band pass filter connected in series with the third demultiplexing unit, wherein the second band pass filter passes a second portion of the second WDM signal, wherein the first portion of the first WDM signal and the second portion of the second WDM signal are different.

11. The receive side wavelength division demultiplexer of claim 10, wherein the first portion of the first WDM signal and the second portion of the second WDM signal are mutually exclusive.

12. The receive side wavelength division demultiplexer of claim 8, further comprising:
   a plurality of first band pass filters, wherein each of the plurality of first band pass filters is connected in series with a respective one of the first plurality of demultiplexing units, wherein the plurality of first band pass filters passes a plurality of first portions of WDM signals;

a plurality of second band pass filters, wherein each of the plurality of second band pass filters is connected in series with a respective one of the second plurality of demultiplexing units, wherein the plurality of second band pass filters passes a plurality of second portions of WDM signals, and wherein the plurality of first portions of WDM signals and the plurality of second portions of WDM signals are different.

13. The transmit side wavelength division demultiplexer of claim 12, wherein the plurality of first portions of WDM signals and the plurality of second portions of WDM signals are mutually exclusive.

14. The system of claim 1, wherein the first plurality of multiplexing units includes:

a first multiplexing unit configured to receive a plurality of input channels and to output a WDM signal based on the plurality of input channels; and a second multiplexing unit configured to receive a plurality of input channels and to receive the WDM signal output by the first multiplexing unit, and to output a WDM signal based on the input channels and the WDM signal output by the first multiplexing unit.

15. The system of claim 1, wherein the first plurality of demultiplexing units includes:

a first demultiplexing unit configured to receive a WDM signal and configured to output a plurality of single optical channels and a WDM signal based on the WDM signal received by the first demultiplexing unit; and a second demultiplexing unit configured to receive the WDM signal output from the first demultiplexing unit and configured to output a plurality of single optical channels demultiplexed from the WDM signal received from the first demultiplexing unit.

16. The system of claim 1, wherein the fiber connection includes at least one repeater.

17. The system of claim 1, further comprising a channel fill component connected to the optical coupler, wherein the channel fill component is configured to provide a predetermined amount of optical power during operation of the system.

18. The system of claim 1 wherein the system includes at least two land portions connected by at least one underwater portion.

* * * * *

UNITED STATES PATENT AND TRADEMARK OFFICE
CERTIFICATE OF CORRECTION

PATENT NO. : 7,130,542 B2
APPLICATION NO. : 10/893048
DATED : October 31, 2006
INVENTOR(S) : Dalma Novak et al.

It is certified that error appears in the above-identified patent and that said Letters Patent is hereby corrected as shown below:

Column 14, ln. 65, delete "the".

Signed and Sealed this

Eighth Day of December, 2009

David J. Kappos
*Director of the United States Patent and Trademark Office*